(12) United States Patent
Tsuchiya (10) Patent No.: US 10,442,487 B2
(45) Date of Patent: Oct. 15, 2019

(54) LIGHTING SYSTEM (71) Applicant: HONDA MOTOR CO., LTD., Tokyo (JP)

(72) Inventor: Yosuke Tsuchiya, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/074,440

(22) PCT Filed: Mar. 9, 2017

(86) PCT No.: PCT/JP2017/009611
§ 371 (c)(1),
(2) Date: Aug. 1, 2018

(87) PCT Pub. No.: WO2017/159549
PCT Pub. Date: Sep. 21, 2017

(65) Prior Publication Data
US 2019/0031266 A1    Jan. 31, 2019

(30) Foreign Application Priority Data
Mar. 17, 2016  (JP) .................. 2016-054370

(51) Int. Cl.
*B62J 6/02* (2006.01)
*F21V 31/03* (2006.01)
(Continued)

(52) U.S. Cl.
CPC ............. *B62J 6/02* (2013.01); *F21S 41/143* (2018.01); *F21S 41/153* (2018.01); *F21S 41/19* (2018.01);
(Continued)

(58) Field of Classification Search
CPC   B62J 6/02; F21V 29/83; F21V 17/005; F21V 19/00; F21V 31/03; F21S 45/33; F21S 41/143; F21S 41/153; F21S 41/19
See application file for complete search history.

(56) References Cited

U.S. PATENT DOCUMENTS

2013/0308310 A1* 11/2013 Wilk .................. F21V 17/04
                                                           362/235
2017/0276335 A1*  9/2017 Yun .................... F21V 29/777

FOREIGN PATENT DOCUMENTS

| JP | 2010-135110 A | 6/2010 |
| JP | 2014-164876 A | 9/2014 |

(Continued)

OTHER PUBLICATIONS

European Search Report dated Oct. 22, 2018, 5 pages.
(Continued)

*Primary Examiner* — Anabel Ton
(74) *Attorney, Agent, or Firm* — Rankin, Hill & Clark LLP (57) ABSTRACT

A lighting system capable of reducing a number of components and cost is provided. A back substrate, a lamp body including front support columns that guide and position the back substrate when the back substrate is attached, and a front substrate that is disposed in the lamp body to be stacked on the back substrate and is fixed to tip end portions of the front support columns are included. The front support columns perform guide and positioning of the back substrate, and fixing of the front substrate, and thereby the number of components and cost of the lamp body are reduced, as compared with a case where the guide portions, positioning portions and fixing portions of the back substrate and the front substrate are individually provided respectively.

5 Claims, 10 Drawing Sheets

(51) Int. Cl.
- *F21V 19/00* (2006.01)
- *F21V 29/83* (2015.01)
- *F21V 17/00* (2006.01)
- *F21S 41/19* (2018.01)
- *F21S 41/143* (2018.01)
- *F21S 45/33* (2018.01)
- *F21S 41/153* (2018.01)
- *F21V 23/00* (2015.01)
- *F21W 107/17* (2018.01)
- *F21Y 115/10* (2016.01)

(52) U.S. Cl.
CPC ............ *F21S 45/33* (2018.01); *F21V 17/005* (2013.01); *F21V 19/00* (2013.01); *F21V 29/83* (2015.01); *F21V 31/03* (2013.01); *F21V 23/006* (2013.01); *F21W 2107/17* (2018.01); *F21Y 2115/10* (2016.08)

(56) References Cited

FOREIGN PATENT DOCUMENTS

| | | |
|---|---|---|
| JP | 2015-6818 A | 1/2015 |
| JP | 2015-220033 A | 12/2015 |

OTHER PUBLICATIONS

International Search Report dated May 30, 2017, 3 pages.
Written Opinion of the International Searching Authority dated May 30, 2017, 6 pages.
Taiwanese Office Action dated Jan. 8, 2018, 5 pages.
Taiwanese Office Action dated Jul. 13, 2018, 4 pages.
PCT International Preliminary Report on Patentability, International Application No. PCT/JP2017/009611, dated Sep. 18, 2018, 9 pages.

\* cited by examiner

LIGHTING SYSTEM

TECHNICAL FIELD

The present invention relates to a lighting system.

BACKGROUND ART

Conventionally, there has been known a lighting system in which a rib for guiding is used when a substrate is assembled to a housing of the lighting system (refer to Patent Literature 1, for example).

CITATION LIST

Patent Literature

[Patent Literature 1]
Japanese Patent Laid-Open No. 2015-6818

SUMMARY OF INVENTION

Technical Problem

In Patent Literature 1, when a plurality of substrates are assembled to the housing, guides and fixing members of the substrates are required redundantly, so that increase in the number of components and cost becomes a problem.

An object of the present invention is to provide a lighting system capable of reducing the number of components and cost.

Solution to Problem

The entire disclosure of Japanese Patent Application No. 2016-054370 filed on Mar. 17, 2016 is incorporated herein by reference in its entirety.

In order to solve the aforementioned problem, an aspect of the present invention includes a first substrate (34), a lamp body (12) including a positioning guide portion (12$j$, 12$k$, 12$m$) that guides and positions the first substrate (34) when the first substrate (34) is attached, and a second substrate (26) that is disposed in the lamp body (12) to be stacked on the first substrate (34) and is fixed to a tip end portion of the positioning guide portion (12$j$, 12$k$, 12$m$).

In the above described constitution, a cutout (34$e$, 34$f$, 34$g$) may be formed at an edge portion of the first substrate (34), and the cutout (34$e$, 34$f$, 34$g$) and the positioning guide portion (12$j$, 12$k$, 12$m$) may be engaged with each other, whereby guide and positioning of the first substrate (34) may be performed.

Further, in the above described constitution, the second substrate (26) may include a light source (21H, 21L, 22H, 22L), the positioning guide portion (12$j$, 12$k$, 12$m$) may be formed at least on each of a left, a right, and an upper portion of the lamp body (12), and in the lamp body (12), fixing portions (12$p$, 12$q$) that fix the first substrate (34) may be respectively disposed at two spots on a straight line (37) that is inclined obliquely with respect to a vertical direction or a horizontal direction.

Further, in the above described constitution, a vent hole (12$v$) that provides communication between an inside and an outside of the lamp body (12) may be provided in the lamp body (12), and on an inner surface of the lamp body (12) outside in a radial direction from the vent hole (12$v$), a recess (14$a$, 14$b$) that forms a gap between the recess (14$a$, 14$b$) and the first substrate (34) may be provided.

Further, in the above described constitution, the vent bore (12$v$) may be provided at one spot in each of an upper half portion and a lower half portion of the lamp body (12), and the vent hole (12$v$) may be positioned at each of opposite sides from the fixing portions (12$p$, 12$q$) with respect to a vertical line (27) passing through a center (10A) of the lamp body (12) in front view of the lamp body (12).

Further, in the above described constitution, at least one of the first substrate (34) and the second substrate (26) may include an electronic component (35) including a wire harness (35$a$), and a cutout (26$k$) for routing the wire harness (35$a$) in a front-back direction of the at least one of the first substrate (34) and the second substrate (26) may be formed at an edge portion.

Further, in the above described constitution, in front view, the vent hole (12$v$) provided in a lower half portion of the lamp body (12) may be provided at a position closer to a circumferential edge portion of the first substrate (34) than the vent hole (12$v$) provided in an upper half portion of the lamp body (12).

Advantageous Effects of Invention

An aspect of the present invention includes the first substrate, the lamp body having the positioning guide portion that guides and positions the first substrate when the first substrate is attached, and the second substrate that is disposed on the lamp body so as to be stacked on the first substrate and is fixed to the tip end portion of the positioning guide portion, so that the positioning guide portion performs guide and positioning of the first substrate and fixing of the second substrate, whereby the number of components and cost can be reduced, as compared with a case where the guide portions, the positioning portions and the fixing portions are individually provided respectively.

Further, the cutout is formed at the edge portion of the first substrate, the cutout and the positioning guide portion are engaged, and thereby guide and positioning of the first substrate are performed, so that favorable guide and positioning are enabled by formation of the cutout into the first substrate.

Further, the second substrate has the light source, the positioning guide portion is formed at least on each of the left, the right, and the upper portion of the lamp body, and in the lamp body, the fixing portions that fix the first substrate are disposed at the two spots on the straight line which is inclined obliquely with respect to the vertical direction or the horizontal direction, so that the fixing portions that fix the first substrate can be formed at the portions that do not interfere with the positioning guide portion. Further, the first substrate can be reliably fixed by the fixing portions. Further, by the positioning guide portion, the second substrate having the light source is reliably fixed, and favorable guide and positioning of the first substrate can be performed.

Further, the vent hole that provides communication between the inside and outside of the lamp body is provided in the lamp body, and on the inner surface of the lamp body outside in the radial direction from the vent hole, the recess which forms the gap between the recess and the first substrate is provided, so that convection of heat can be smoothly performed on the front and back surfaces of the first substrate by the recess.

Further, the vent bore is provided at one spot in each of the upper half portion and the lower half portion of the lamp body, and the vent hole is positioned at each of opposite sides from the fixing portions with respect to the vertical line passing through the center of the lamp body in front view of the lamp body, so that the vent hole can be disposed in each of the lower half portion and the upper half portion of the lamp body to avoid overlapping of the vent hole and each fixing portion, and ventilation in the inside and the outside of the lamp body can be prompted by using convection in the lamp body.

Further, at least one of the first substrate and the second substrate has the electronic component including the wire harness, and the cutout for routing the wire harness in the front-back direction of the at least one of the first substrate and the second substrate is formed at the edge portion, so that routing of the wire harness in the front-back direction of the at least one of the first substrate and the second substrate is facilitated, workability can be enhanced, assemblability of the at least one of the first substrate and the second substrate can be enhanced, and a degree of freedom of layout can be enhanced.

Further, in front view, the vent hole which is provided in the lower half portion of the lamp body is provided at a position closer to the circumferential edge portion of the first substrate than the vent hole which is provided in the upper half portion of the lamp body, so that the flow rate of the air flow passing through the gap between the lamp body side and the first substrate can be increased by convection of heat in the lamp body. As a result, inflow of the air from the vent hole provided in the lower half portion of the lamp body and outflow of the air from the vent hole provided in the upper half portion of the lamp body can be prompted.

BRIEF DESCRIPTION OF DRAWINGS

FIGS. 10A and 10B are sectional views illustrating a vent hole and a periphery of the vent hole.

DESCRIPTION OF EMBODIMENT

Hereinafter, an embodiment of the present invention will be described with reference to the drawings. Note that in the explanation, statements of the directions such as front and back, left and right, and up and down are the same as the directions concerning a vehicle body unless otherwise noted. Further, reference sign FR shown in each drawing denotes a front of the vehicle body, reference sign UP denotes an upper side of the vehicle body, and reference sign LH denotes a left side of the vehicle body.

Figure 1:
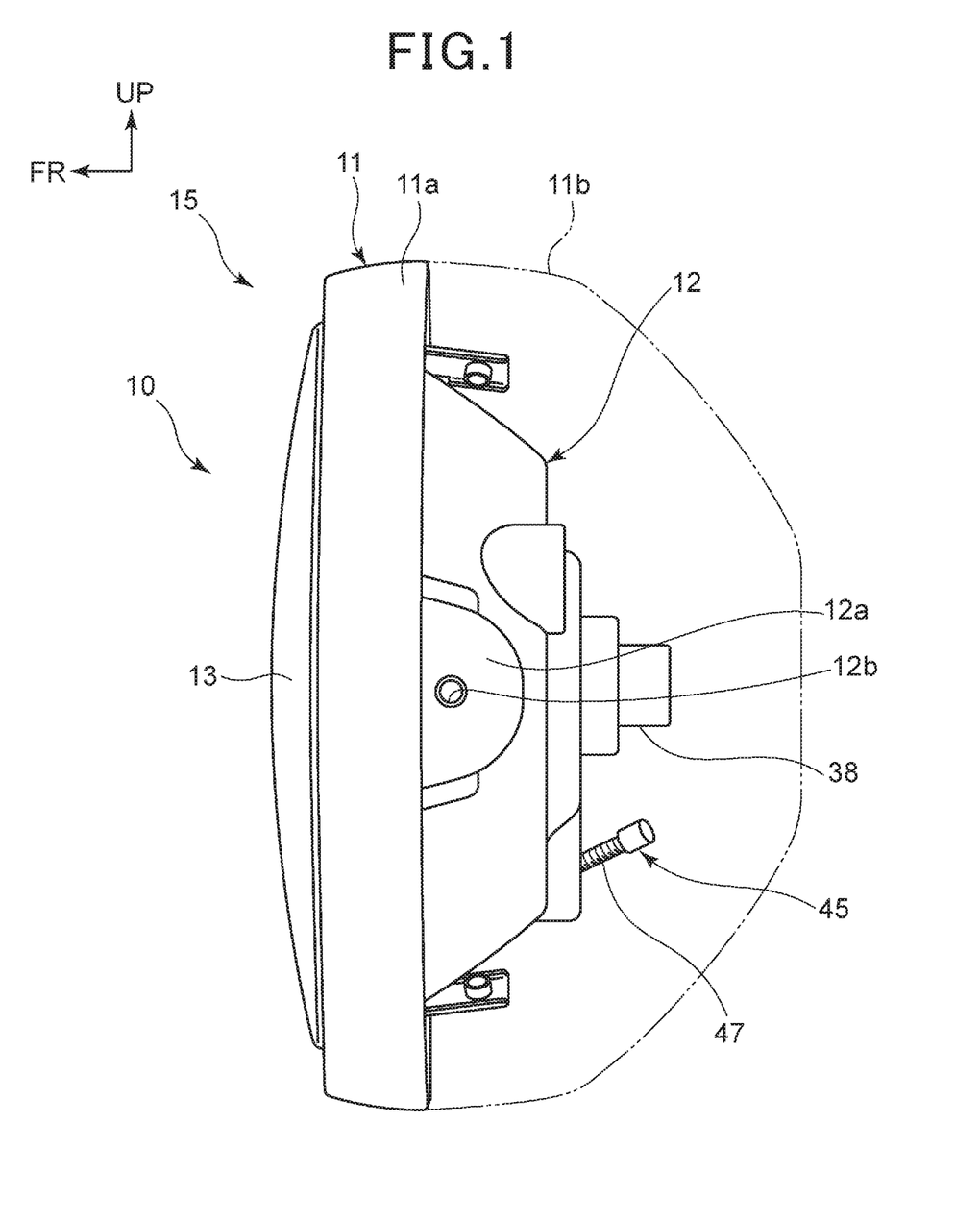
FIG. 1 is a side view illustrating a headlight.

FIG. 1 is a side view illustrating a headlight 10.

The headlight 10 is a lighting system including a lamp body 12 that is supported by a housing 11 attached to a front fork of a motorcycle, and a transparent outer lens 13 that is disposed at a front of the lamp body 12 and is attached to an outer circumferential edge of the lamp body 12. The headlight 10 and the housing 11 constitute a headlight assembly 15.

The housing 11 is constituted to be dividable longitudinally into a front housing 11a and a back housing 11b, and houses the headlight 10.

The lamp body 12 is an integrally molded product formed into a cup shape and made of a resin. Support bores 12b for supporting the headlight 10 at a front fork side are provided in side portions 12a at both sides of the lamp body 12. The outer lens 13 is exposed to outside from an opening provided in a front part of the housing 11.

Figure 2:
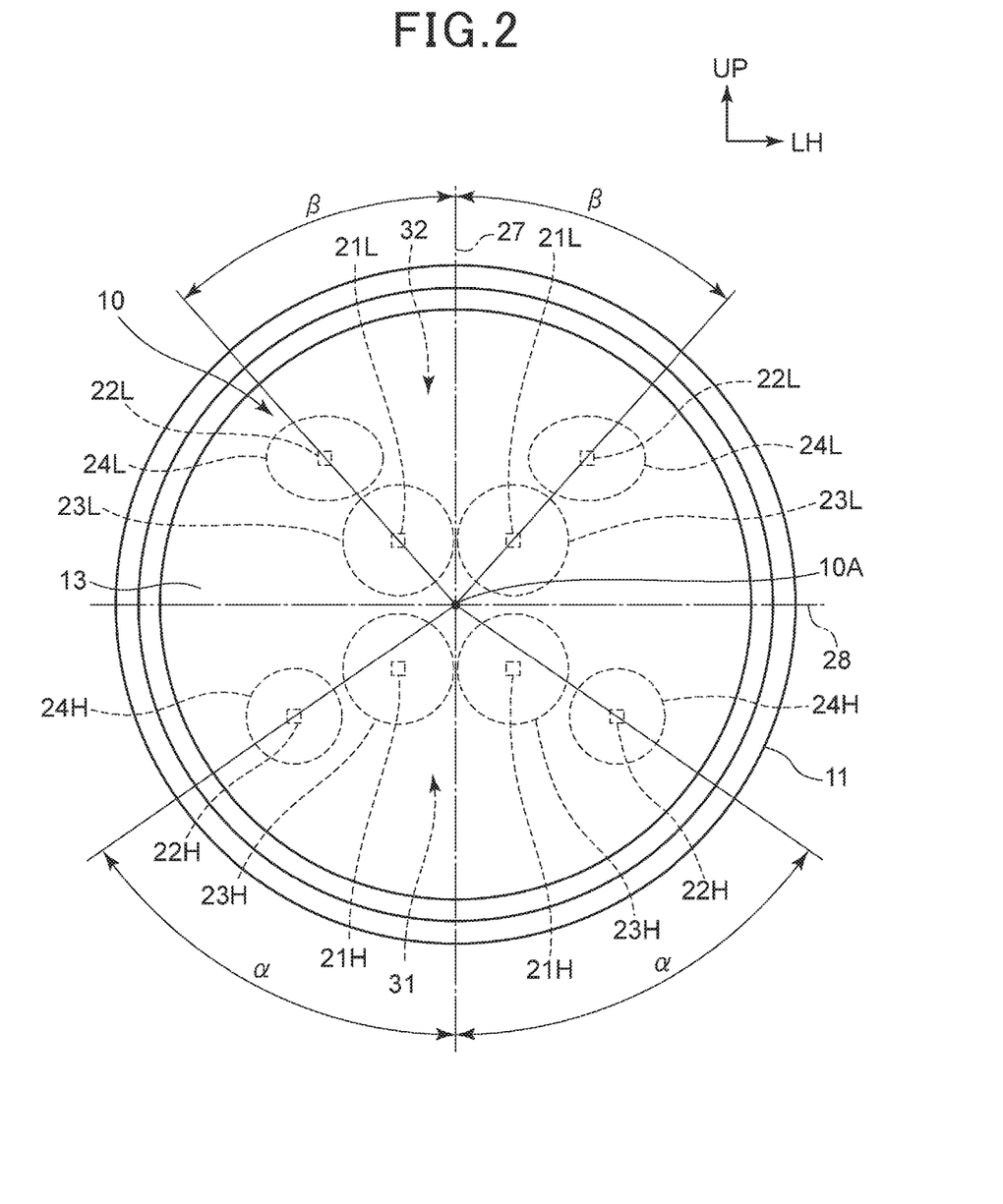
FIG. 2 is a front view illustrating the headlight.

FIG. 2 is a front view illustrating the headlight 10.

Inside the outer lens 13, the headlight 10 includes a plurality of LED chips 21H, 21L, 22H and 22L that are light sources, and a plurality of small lenses 23H, 23L, 24H and 24L that are respectively disposed in front of the LED chips 21H, 21L, 22H and 22L.

The plurality of LED chips 21H, 21L, 22H and 22L are attached to a front surface of a front substrate 26 disposed behind the outer lens 13. The plurality of small lenses 23H, 23L, 24H and 24L are supported by a lens support member (not illustrated) that is attached to the lamp body 12.

The plurality of small lenses 23H and 23L are lenses circular in outer shapes, and are each formed of a Fresnel lens, for example. The plurality of small lenses 24H are lenses circular in outer shapes, have smaller outside diameters than the small lenses 23H and 23L, and are each formed of a dome type lens, for example. The plurality of small lenses 24L are lenses elliptical in outer shapes, and are each formed of a dome type lens, for example. Note that reference sign 10A denotes a center of the headlight 10 in front view, and also denotes a center of the lamp body 12 and the outer lens 13 described above.

Figure 3:
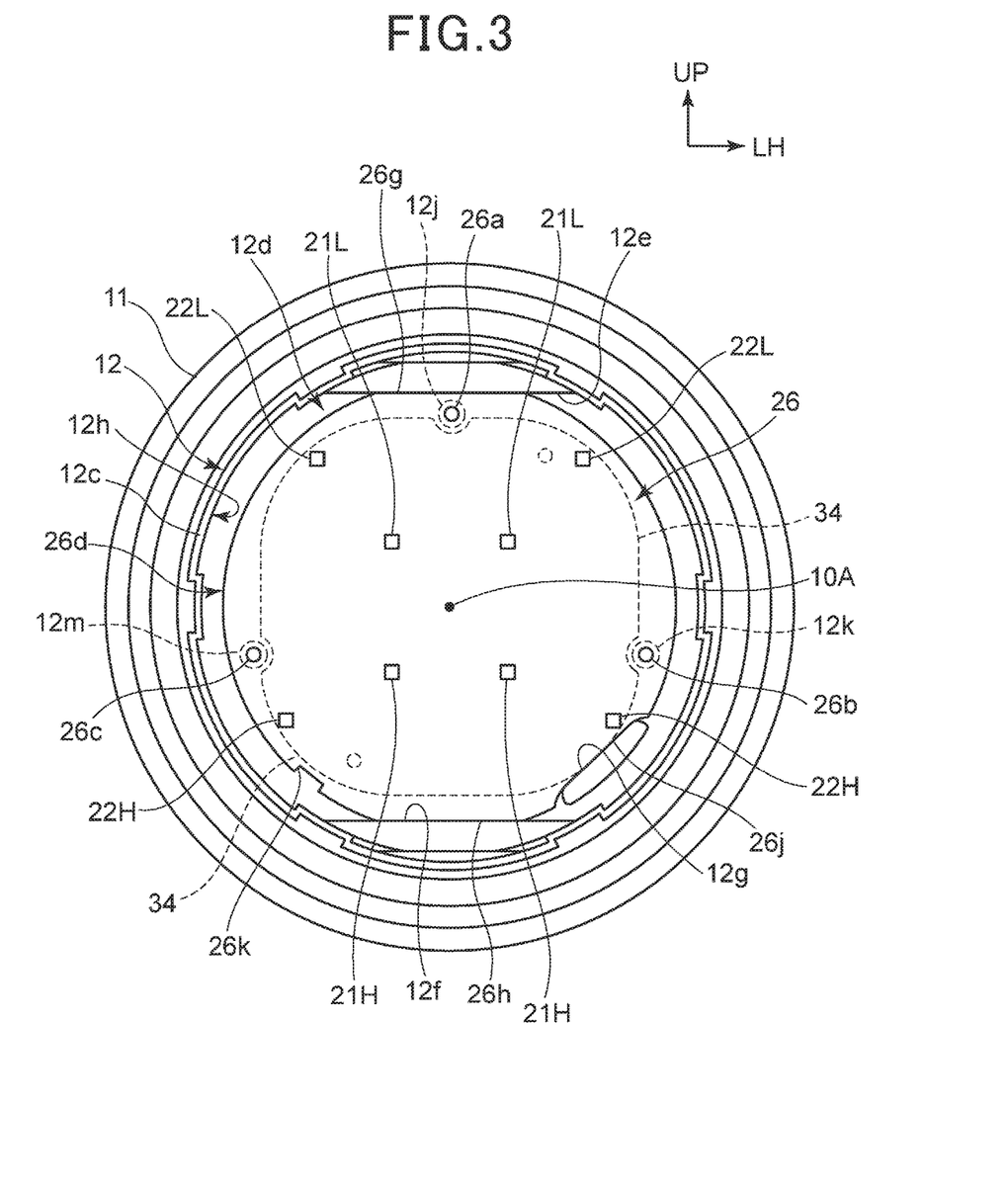
FIG. 3 is a front view illustrating a state where an outer lens and a lens support body are detached from the headlight illustrated in FIG. 2.

FIG. 3 is a front view illustrating a state where the outer lens 13 and the lens support body are detached from the headlight 10 illustrated in FIG. 2.

The lamp body 12 integrally includes an annular circumferential wall 12c, and a cup portion 12d that is integrally provided at a rear edge of the circumferential wall 12c and is formed into a cup shape.

In the cup portion 12d, front support columns 12j, 12k and 12m are respectively formed at an upper portion, a left portion and a right portion of the cup portion 12d in such a manner as to protrude forward, and the front substrate 26 is attached to the front support columns 12j, 12k and 12m by a plurality of screws (not illustrated).

The front substrate 26 has an outer shape formed into a substantially circular shape that is smaller than an opening portion 12h of the circumferential wall 12c of the lamp body 12, and screw insertion bores 26a, 26b and 26c for passing screws for attaching are opened in an upper portion, a left side portion and a right side portion of the front substrate 26. The front substrate 26 is attached to the front support columns 12j, 12k and 12m by the screws which are respectively passed through the plurality of screw insertion bores 26a, 26b and 26c.

In FIG. 2 and FIG. 3, the plurality of LED chips 21H and 21L are respectively aligned with spaces left in a vertical direction and a lateral direction (a vehicle width direction), in a central portion of the front substrate 26, and are disposed equidistantly or substantially equidistantly from the center 10A of the headlight 10.

The plurality of LED chips 22H and 22H are disposed separately from the plurality of LED chips 21H and 21L to an outer circumferential side with respect to the center 10A, are disposed at a lower side from the LED chips 21H, and are disposed equidistantly or substantially equidistantly from the center 10A. The adjacent LED chips 22H and 22H are disposed to be separated by an angle α with respect to a vertical line 27 passing through the center 10A.

The plurality of LED chips 22L and 22L are disposed separately from the plurality of LED chips 21H and 21L to the outer circumferential side with respect to the center 10A, are disposed at an upper side from the LED chips 21L, and are disposed equidistantly or substantially equidistantly from the center 10A. The adjacent LED chips 22L and 22L are disposed to be separated by an angle β with respect to the vertical line 27 passing through the center 10A.

The small lenses 23H are respectively disposed in front of the plurality of LED chips 21H, and the plurality of small lenses 23L are respectively disposed in front of the plurality of LED chips 21L.

Further, the plurality of small lenses 24H are respectively disposed in front of the plurality of LED chips 22H, and the plurality of small lenses 24L are respectively disposed in front of the plurality of LED chips 22L.

The small lenses 23H and 23L are aligned in the vertical direction and the lateral direction, and the adjacent small lenses 23H and 23L are disposed closely to each other. The plurality of small lenses 24H and 24L are disposed around the plurality of small lenses 23H and 23L.

The plurality of LED chips 21H and 22H, and the plurality of small lenses 23H and 24H are positioned at a lower side with respect to a horizontal line 28 passing through the center 10A, and constitute a lower light unit 31 that emits main beam (high beam).

The plurality of LED chips 21L and 22L and the plurality of small lenses 23L and 24L are positioned at an upper side with respect to the horizontal line 28, and constitute an upper light unit 32 that emits passing beam (low beam).

In FIG. 3, the cup portion 12d includes vertical walls 12e and 12f that are formed at an upper portion and a lower portion of the cup portion 12d to extend horizontally and rectilinearly, and an inclined wall 12g that is formed to incline to be close to a left side of the vertical wall 12f at a lower side and extend rectilinearly.

The front substrate 26 includes linear edge portions 26g and 26h that are formed at an upper edge and a lower edge of a circumferential edge portion 26d of the front substrate 26 to extend horizontally and rectilinearly, and an inclined edge portion 26j that is formed at the circumferential edge portion 26d to incline to be close to a left side of the linear edge portion 26h at a lower side and extend rectilinearly.

The linear edge portions 26g and 26h and the inclined edge portion 26j of the front substrate 26 are positioned by the vertical walls 12e and 12f and the inclined wall 12g of the lamp body 12, and rotation of the front substrate 26 to the lamp body 12 is regulated. By providing the inclined wall 12g and the inclined edge portion 26j described above, incorrect assembly that the front substrate 26 is assembled by mistaking a front and a back of the front substrate 26 to the lamp body 12 can be prevented.

The circumferential edge portion 26d of the front substrate 26 is formed into a part of a circle except for the linear edge portions 26g and 26h, the inclined edge portion 26j and both side portions at both sides of the inclined edge portion 26j, and a cutout 26k that will be described later.

Behind the front substrate 26, a back substrate 34 with an outer shape made smaller than the front substrate 26 is disposed with a gap left. In front view, the back substrate 34 is positioned inward of the circumferential edge portion 26d of the front substrate 26.

In the front substrate 26, the cutout 26k for passing the wire harness 35a (refer to FIG. 4) in a front-back direction of the front substrate 26 is formed at the circumferential edge portion 26d of the front substrate 26 (in detail, the circumferential edge portion 26d in a vicinity of the LED chip 22H at the right side).

Figure 4:
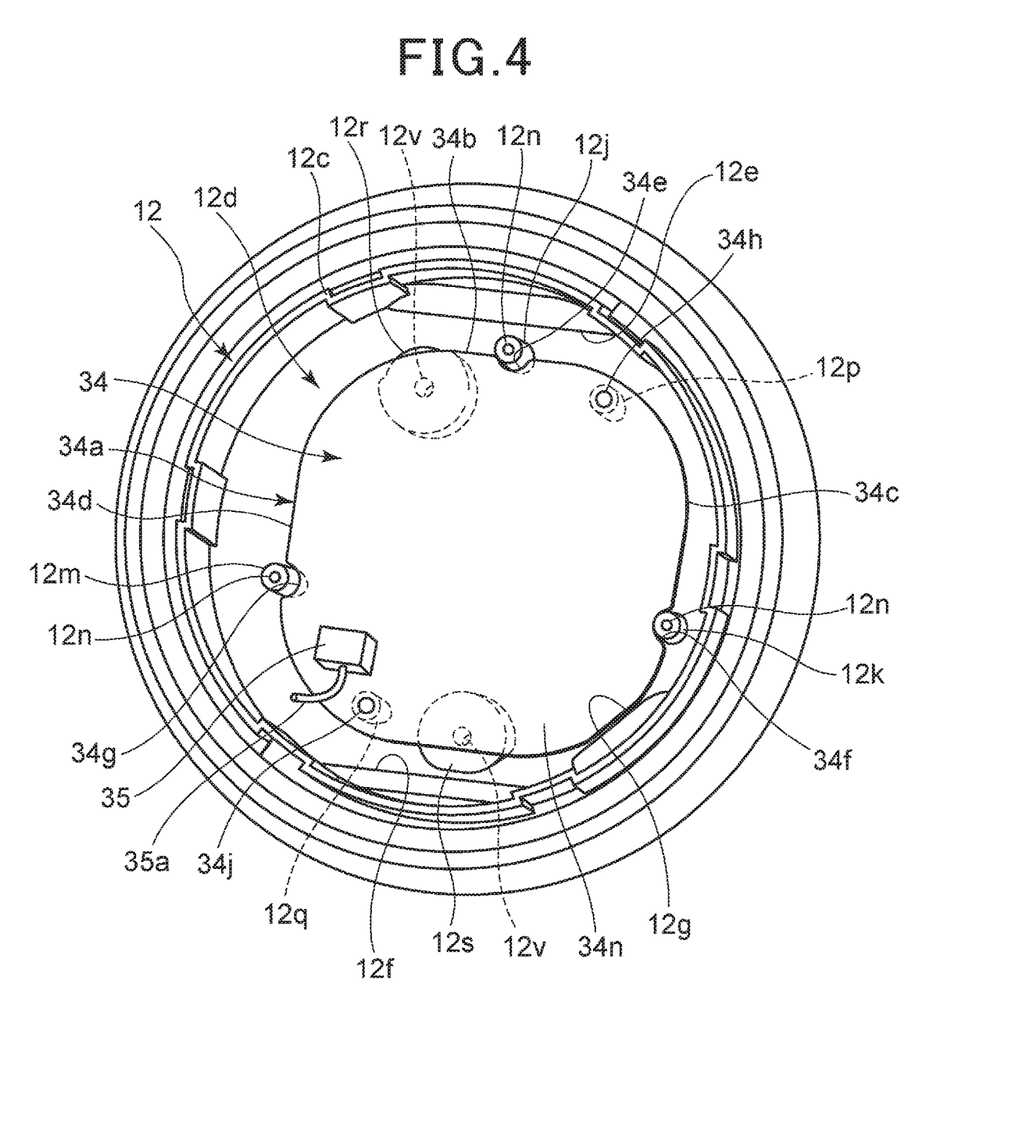
FIG. 4 is a perspective view illustrating a state where a front substrate is detached from the state in FIG. 3.

FIG. 4 is a perspective view illustrating a state where the front substrate 26 is detached from the state in FIG. 3.

Figure 5:
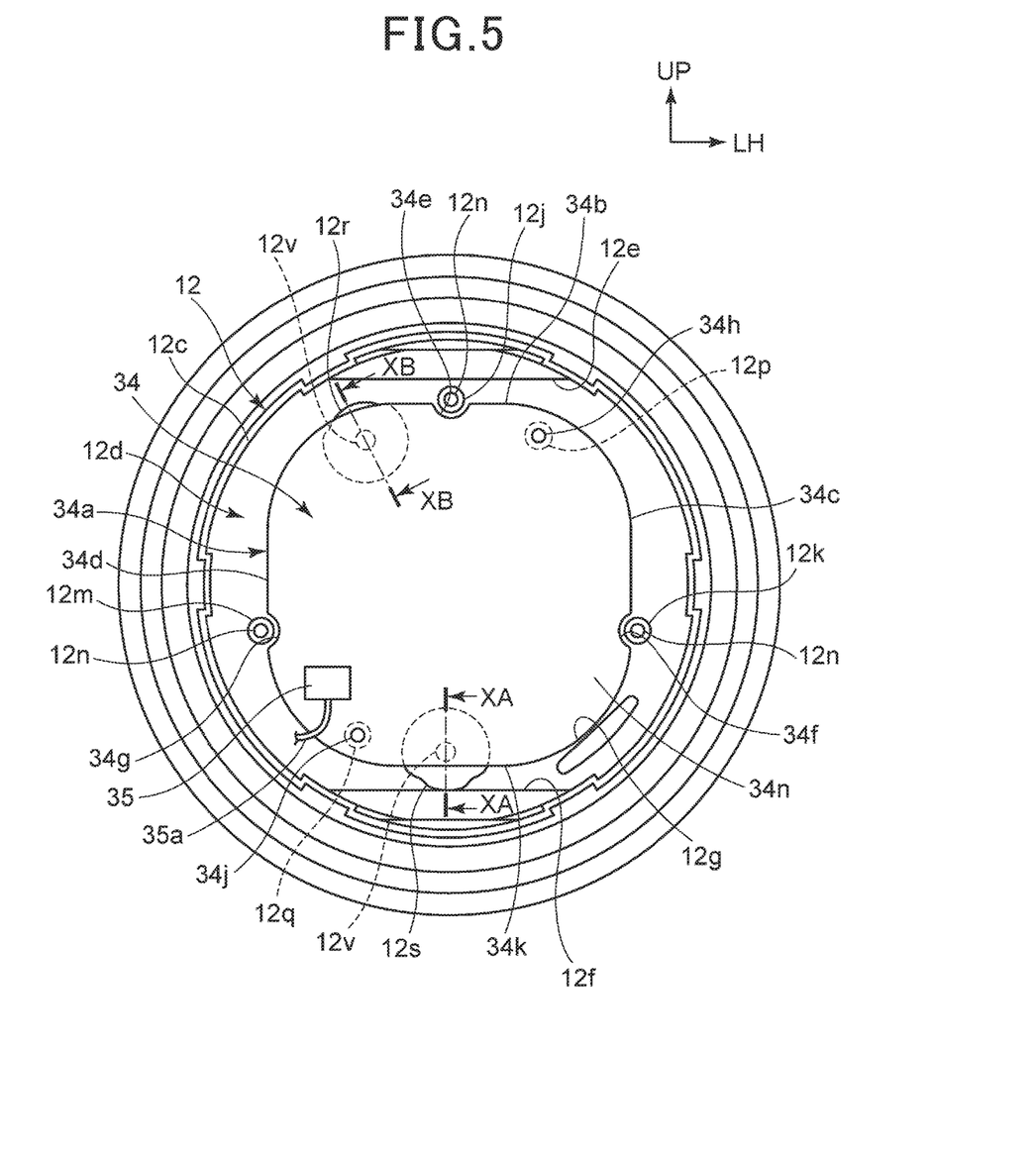
FIG. 5 is a front view illustrating a state where the front substrate is detached from the state in FIG. 3.

FIG. 5 is a front view illustrating the state where the front substrate 26 is detached from the state in FIG. 3.

As illustrated in FIG. 4 and FIG. 5, in the lamp body 12, the front support columns 12j, 12k and 12m are formed at the upper portion, the left portion and the right portion of the cup portion 12d so as to protrude forward respectively. In the front support columns 12j, 12k and 12m, front side screw bores 12n into which the screws are screwed are opened.

The back substrate 34 has an outer shape formed into a shape close to a rectangle. The back substrate 34 includes cutouts 34e, 34f and 34g that are formed respectively at an upper edge portion 34b, a left edge portion 34c and a right edge portion 34d of a circumferential edge portion 34a of the back substrate 34. Further, the back substrate 34 includes an upper screw insertion bore 34h that is opened at a left side from the cutout 34e of the upper edge portion 34b, and a lower screw insertion bore 34j that is opened at a right side from a center of a lower portion of the back substrate 34.

In the circumferential edge portion 34a of the back substrate 34, the upper edge portion 34b, the left edge portion 34c, the right edge portion 34d and the lower edge portion 34k are formed rectilinearly except for the cutouts 34e, 34f and 34g, and parts except for the left edge portion 34c, the right edge portion 34d and the lower edge portion 34k are formed into circular arc shapes that are protruded radially outward. That is, the upper edge portion 34b, the left edge portion 34c, the right edge portion 34d and the lower edge portion 34k are respectively connected to one another by circular arcs.

The upper edge portion 34b and the lower edge portion 34k, and the left edge portion 34c and the right edge portion 34d are formed to be respectively parallel with each other except for the cutouts 34e, 34f and 34g.

The cutouts 34e, 34f and 34g of the back substrate 34 are respectively engaged with the front support columns 12j, 12k and 12m of the lamp body 12, and the back substrate 34 is positioned to the lamp body 12. Further, when the back substrate 34 is assembled to the lamp body 12, the front support columns 12j, 12k and 12m become guide portions, that is, guides for assembly of the back substrate 34.

In the lamp body 12 behind the back substrate 34, back support columns 12p and 12q that are positioned behind the upper screw insertion bore 34h and the lower screw insertion bore 34j, and a pair of protruded portions 12r and 12s are integrally formed at the cup portion 12d.

To the back substrate 34 (in detail, a front surface 34n of the back substrate 34), at least one electronic component 35 relating to lighting of the LED chips 21H, 21L, 22H and 22L (refer to FIG. 3) is attached. The electronic component 35 includes the wire harness 35a constituted of a plurality of conducting wires, and is connected to a control component that controls lighting of the LED chips 21H, 21L, 22H and 22L via the wire harness 35a. The wire harness 35a extends to a front side of the front substrate 26 through the cutout 26k (refer to FIG. 3) of the front substrate 26 (refer to FIG. 3) from the electronic component 35.

Figure 6:
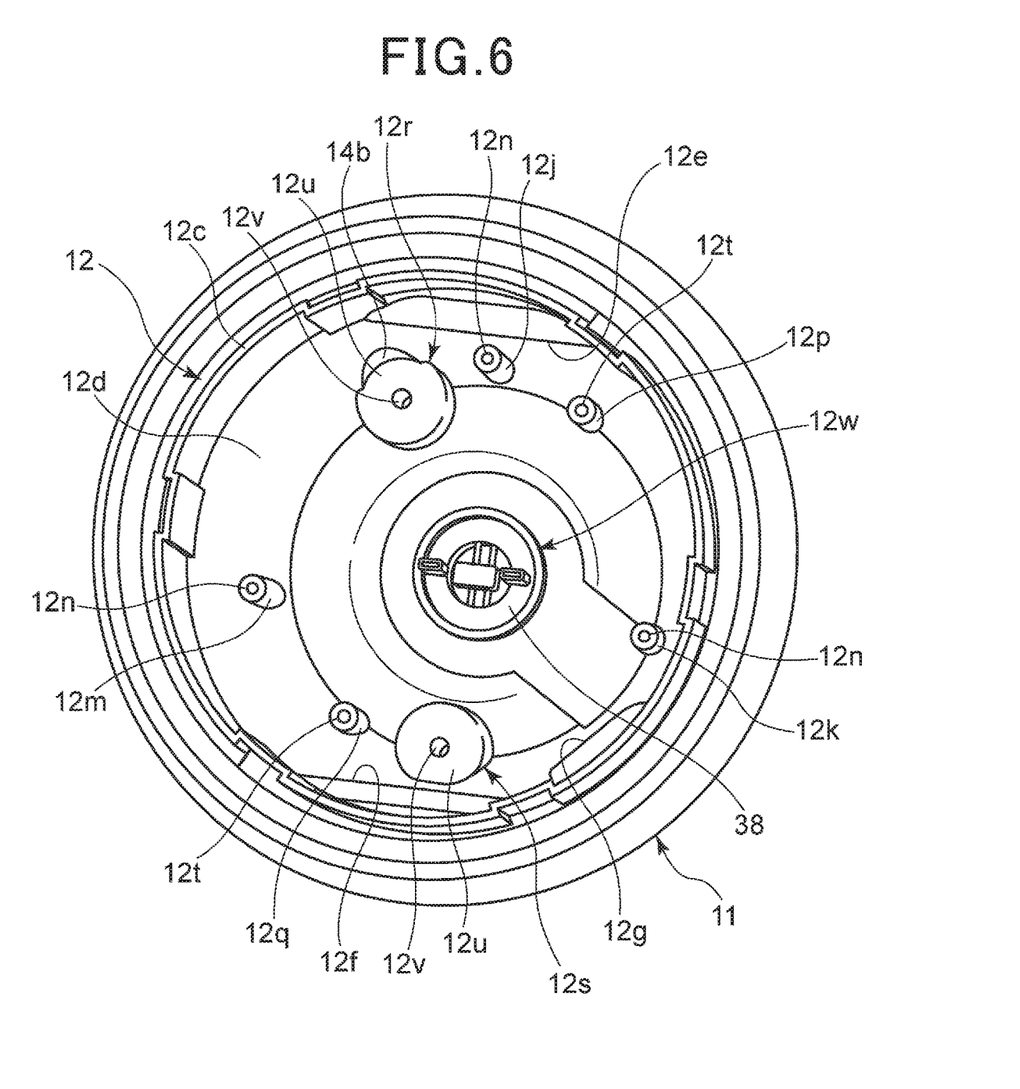
FIG. 6 is a perspective view illustrating a state where a back substrate is detached from the state in FIG. 4.
Figure 7:
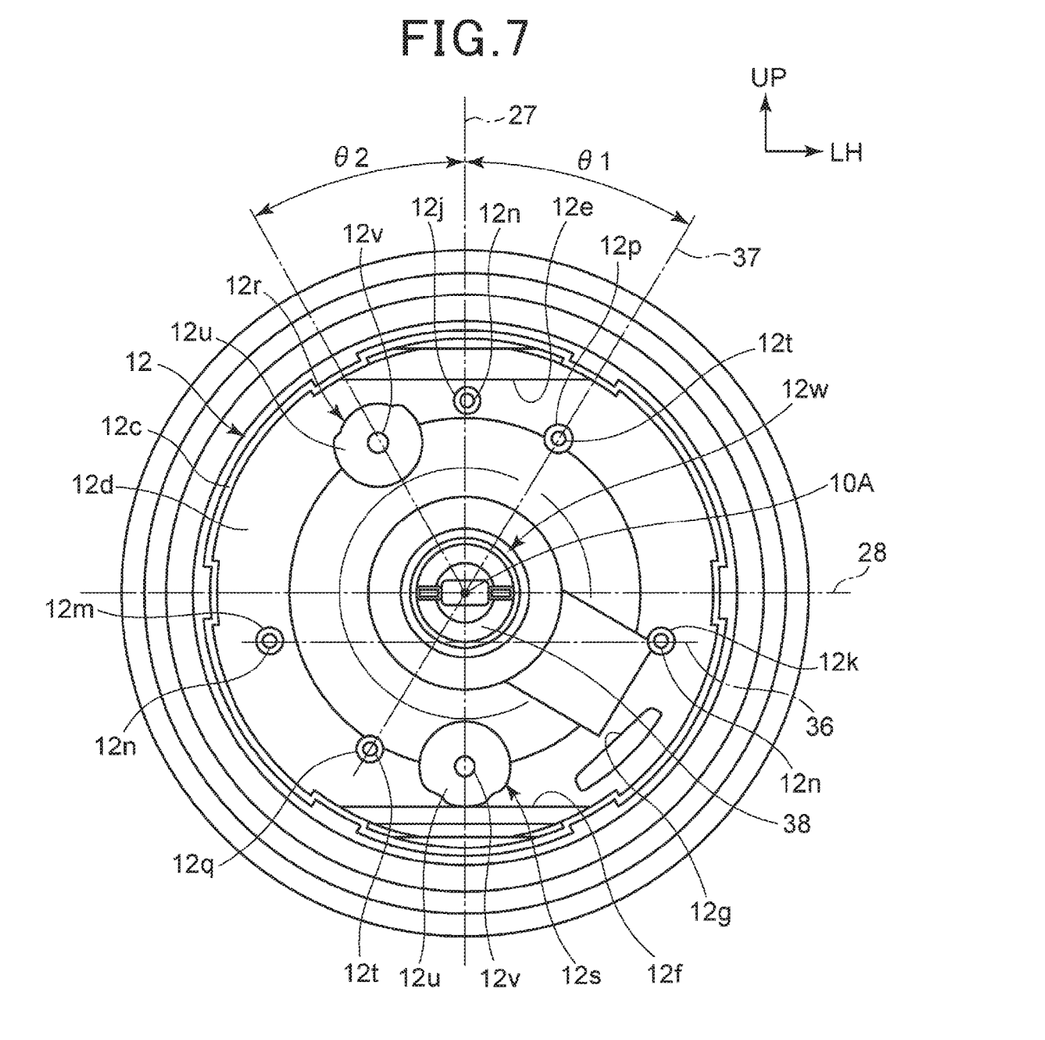
FIG. 7 is a front view illustrating a state where the back substrate is detached from the state in FIG. 5.

FIG. 6 is a perspective view illustrating a state where the back substrate 34 is detached from the state in FIG. 4. FIG. 7 is a front view illustrating a state where the back substrate 34 is detached from the state in FIG. 5.

As illustrated in FIG. 6 and FIG. 7, out of the front support columns 12*j*, 12*k* and 12*m*, the front support column 12*j* which is formed at the upper portion of the lamp body 12 is positioned on the vertical line 27, and the other front support columns 12*k* and 12*m* are disposed at a lower side from the horizontal line 28 and is positioned on a horizontal straight line 36. Distances from the center 10A, of the front support columns 12*j*, 12*k* and 12*m* are equal or substantially equal. When the distances from the center 10A, of the front support columns 12*j*, 12*k* and 12*m* are all made equal, the front support columns 12*j*, 12*k* and 12*m* including the front side screw bores 12*n* can be made easy to form, and productivity can be enhanced.

The back support columns 12*p* and 12*q* are portions that support the back substrate 34 (refer to FIG. 5), and are formed at the cup portion 12*d* so as to be positioned on a straight line 37 that is inclined by an angle θ1 clockwise with respect to the vertical line 27. On tip end surfaces of the back support columns 12*p* and 12*q*, back side screw bores 12*t* into which screws (not illustrated) that fasten the back substrate 34 are screwed are opened respectively. Distances from the center 10A, of the back support columns 12*p* and 12*q* are equal or substantially equal. When the distances from the center 10A, of the back support columns 12*p* and 12*q* are made equal, productivity of the back support columns 12*p* and 12*q* including the back side screw bores 12*t* can be enhanced.

In the protruded portions 12*r* and 12*s*, vent holes 12*v* that provide communication between an inside and an outside of the headlight 10 (refer to FIG. 2) (that is, an inside and an outside of the lamp body 12) are opened in each of a front surface 12*u*. The vent holes 12*v* make it possible to perform ventilation from the inside of the headlight 10 to the outside or to the inside of the headlight 10 from the outside at a time of rise or at a time of drop of a temperature in the headlight 10.

Out of the protruded portions 12*r* and 12*s*, the protruded portion 12*r* which is formed at the upper portion of the lamp body 12 and the vent hole 12*v* are formed in a position inclined by an angle θ2 counterclockwise with respect to the vertical line 27. The angle θ2 differs from the angle θ1, but when θ2=θ1 is established, the back support column 12*p* including the back side screw bore 12*t* and the protruded portion 12*r* including the vent hole 12*v* can be easily formed, and productivity can be enhanced.

Further, out of the protruded portions 12*r* and 12*s*, the protruded portion 12*s* which is formed at the lower portion of the lamp body 12 and the vent hole 12*v* are formed to be positioned on the vertical line 27.

A connector fitting portion 12*w* is formed in a central portion of the cup portion 12*d* of the lamp body 12, and a connector 38 is fitted to an opening portion provided in the connector fitting portion 12*w*. In the connector 38, conducting wires extending from the front substrate 26 (refer to FIG. 3) and the back substrate (refer to FIG. 4) are connected to a front surface of the connector 38, and a wire harness extending from a power supply side is connected to a rear surface of the connector 38.

Figure 8:
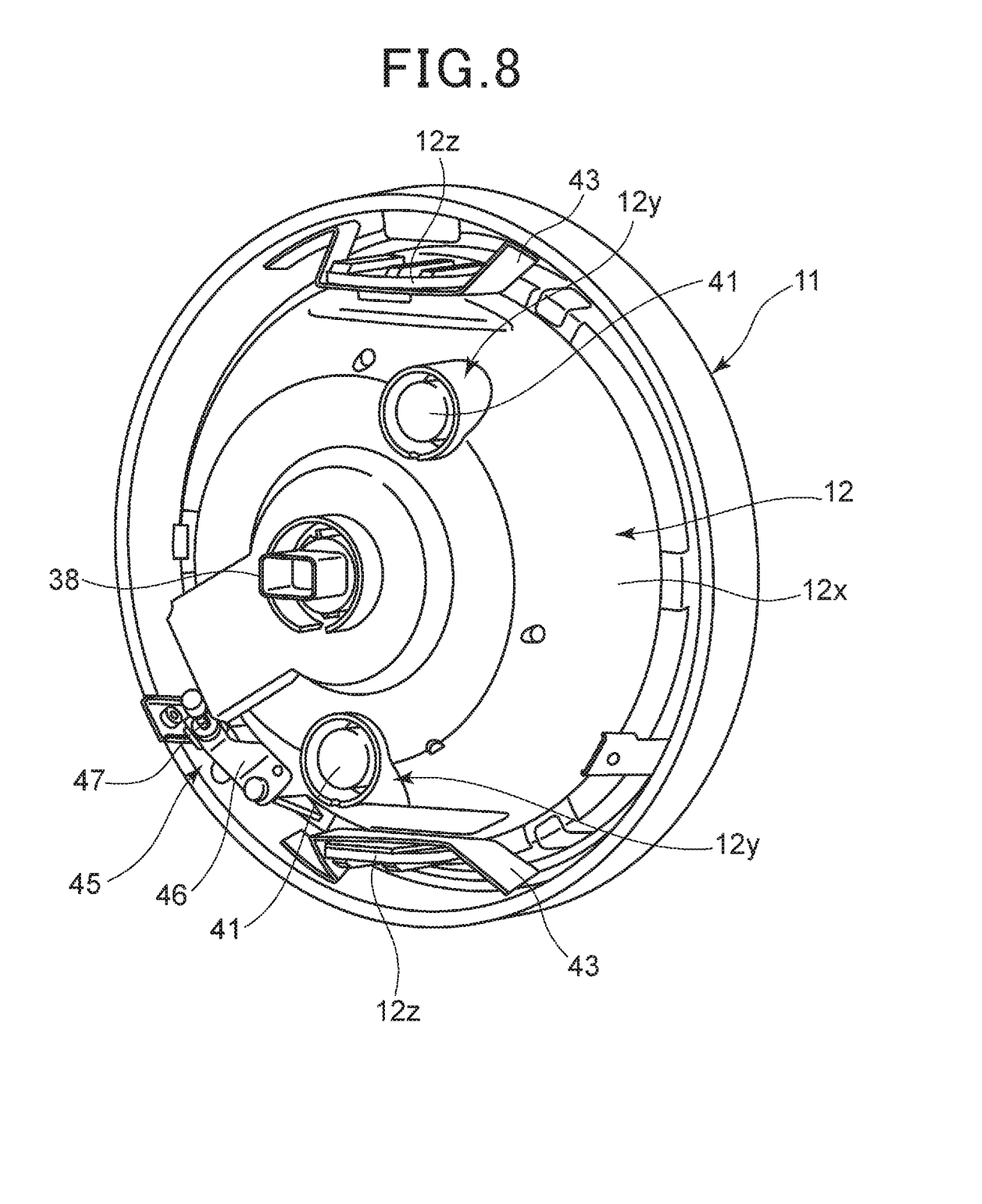
FIG. 8 is a perspective view illustrating rear surfaces of a housing and a lamp body.
Figure 9:
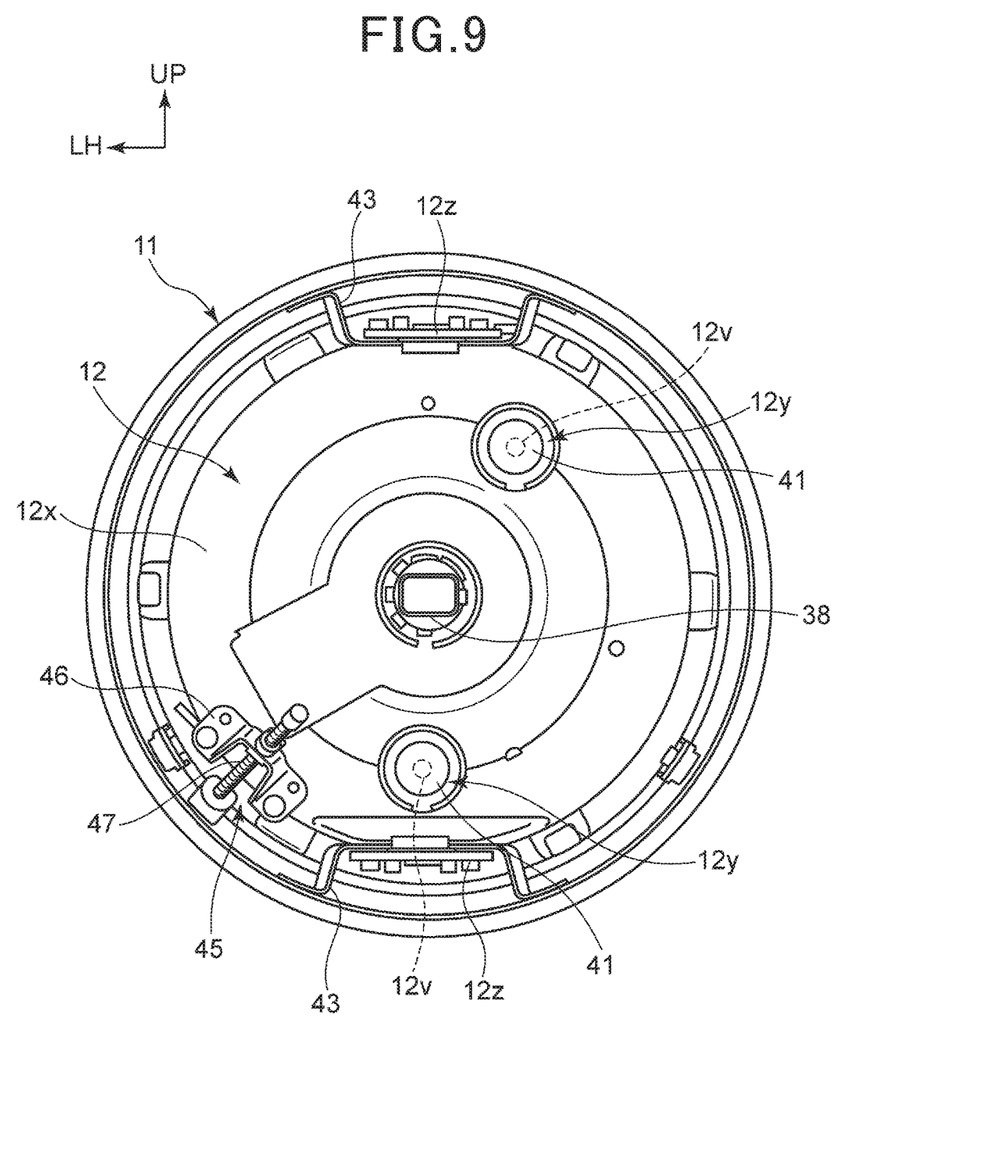
FIG. 9 is a rear view illustrating the rear surfaces of the housing and the lamp body.

FIG. 8 is a perspective view illustrating rear surfaces of the housing 11 and the lamp body 12. FIG. 9 is a rear view illustrating the rear surfaces of the housing 11 and the lamp body 12.

As illustrated in FIG. 8 and FIG. 9, in the lamp body 12, cap fitting portions 12*y* and 12*y* are integrally provided in a position which is on a rear surface 12*x* of the lamp body 12 and corresponds to the protruded portions 12*r* and 12*s* (refer to FIG. 7) in which the vent holes 12*v* are provided. Inside the cap fitting portion 12*y*, a cap 41 that restrains dust, rainwater and the like from entering the vent holes 12*v* from outside is fitted. Air flows in the inside and the outside of the headlight 10 (refer to FIG. 2) by passing through a gap between the lamp body 12 and the cap 41. The cap fitting portion 12*y* has a labyrinth structure, and therefore can restrain entry of dust, rainwater and the like into the lamp body 12 from the vent hole 12*v* far more with the cap 41.

In the housing 11, lamp body support tools 43 that support the lamp body 12 are attached to an inner circumferential surface in an upper end portion and a lower end portion of the housing 11. Plate-shaped supported portions 12*z* and 12*z* that protrude backward are formed at an upper end portion and a lower end portion of the lamp body 12, and the supported portions 12*z* and 12*z* are attached to and supported by the lamp body support tools 43 of the housing 11.

To the connector 38 which protrudes from the rear surface 12*x* of the lamp body 12, a wire harness ((not illustrated) in detail, a connector provided at an end portion of the wire harness) that supplies power for causing the LED chips 21H, 21L, 22H and 22L (refer to FIG. 2) to emit light is connected.

An optical axis adjusting section 45 that adjusts an optical axis of the headlight 10 is provided in a position deviating sideway from the lower end portion of the lamp body 12. The optical axis adjusting section 45 includes a base portion 46 that is attached to the rear surface 12*x* of the lamp body 12, and a screw 47 that is screw-connected to the base portion 46. In screw 47, a tip end portion of the screw 47 is rotatably engaged with a housing 11 side. By rotating the screw 47, the headlight 10 inclines with respect to the housing 11, and the optical axis of the headlight 10 becomes adjustable.

Figure 10A:
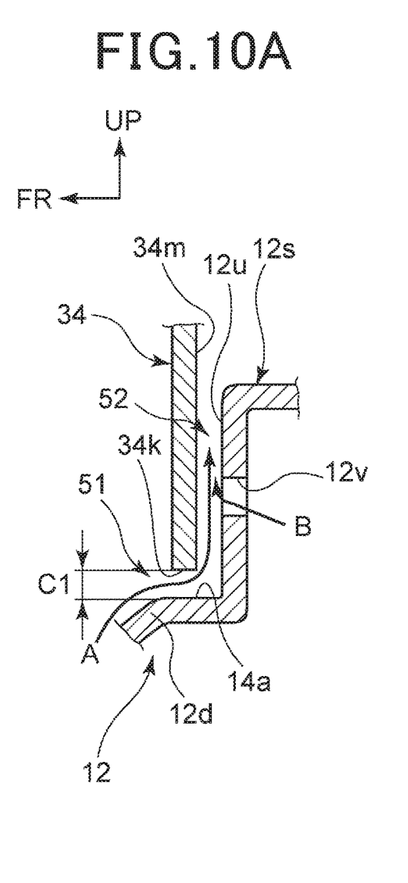
FIG. 10A is a sectional view taken along line XA-XA in FIG. 5.
Figure 10B:
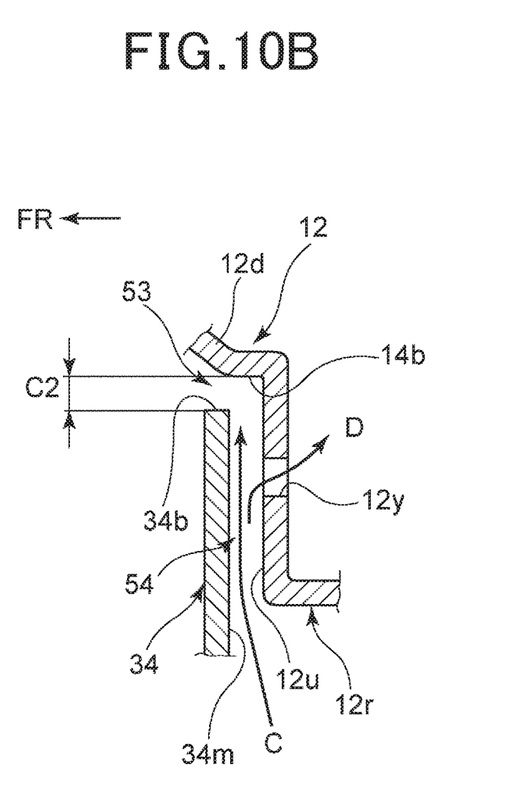
FIG. 10B is a sectional view taken along line XB-XB in FIG. 5.

FIG. 10 is a sectional view illustrating the vent hole 12*v* and a periphery of the vent hole 12*v*. FIG. 10A is a sectional view taken along line XA-XA in FIG. 5, and FIG. 10B is a sectional view taken along line XB-XB in FIG. 5.

As illustrated in FIG. 10A, in a lower portion of the cup portion 12*d*, at a lower side of the front surface 12*u* of the protruded portion 12*s*, a raised surface 14*a* extending forward substantially horizontally from a lower edge of the front surface 12*u* is formed. The raised surface 14*a* is a portion that is made by forming the protruded portion 12*s* at the cup portion 12*d*, and is a recess that is formed into a curved surface protruded downward. A gap 51 of a distance C1 is provided between the raised surface 14*a* and the lower edge portion 34*k* of the back substrate 34. Further, a gap 52 is provided between the front surface 12*u* of the protruded portion 12*s* and a back surface 34*m* of the back substrate 34.

As illustrated in FIG. 10B, in an upper portion of the cup portion 12*d*, at an upper side of the front surface 12*u* of the protruded portion 12*r*, a raised surface 14*b* extending forward substantially horizontally from an upper edge of the front surface 12*u* is formed. The raised surface 14*b* is a portion that is made by forming the protruded portion 12*r* at the cup portion 12*d*, and is a recess that is formed into a curved surface protruded upward. A gap 53 of a distance C2 is provided between the raised surface 14*b* and the upper edge portion 34*b* of the back substrate 34. Further, a gap 54 is provided between the front surface 12*u* of the protruded portion 12*r* and the back surface 34*m* of the back substrate 34.

Operations of the respective vent holes 12v of the protruded portions 12r and 12s described above will be described next.

In FIG. 10A, when the LED chips 21H, 21L, 22H and 22L (refer to FIG. 3) are turned on, and a temperature in the headlight 10 (refer to FIG. 2) rises, convection of air occurs in the headlight 10.

At this time, a part of air in the vicinity of the protruded portion 12s in the headlight 10 flows into the gap 52 through the gap 51 as illustrated by an arrow A, and rises in the gap 52. Further, air outside the headlight 10 flows into the headlight 10 through the vent hole 12v as illustrated by an arrow B, and rises in the gap 52.

Further, in FIG. 10B, a part of air rising in the headlight 10 rises in the gap 54 as illustrated by an arrow C, and further moves to a front side of the back substrate 34 through the gap 53 from the back surface 34m side of the back substrate 34. Further, a part of air flows to the outside of the headlight 10 through the vent hole 12v from the gap 54 as illustrated by an arrow D.

In this way, by providing the vent holes 12v at the lower portion and the upper portion of the lamp body 12, ventilation from the inside of the lamp body 12 to the outside, and ventilation to the inside of the lamp body 12 from the outside can be prompted by using convection or pressure change in the lamp body 12, and temperature rise in the headlight 10 can be suppressed.

In FIG. 5 and FIGS. 10A and 10B, the gaps 52 and 54 are provided between the protruded portions 12r and 12s and the back substrate 34, so that it is possible to perform ventilation between the inside and the outside of the lamp body 12 with only the gaps 52 and 54, and by providing the gaps 51 and 53 respectively at the lower side and the upper side of the protruded portions 12r and 12s in addition to the gaps 52 and 54, a flow rate of the air flowing in the gaps 52 and 54 can be increased by convection. Thereby, the flow rate of the air passing through the vent holes 12v can be also increased, and temperature adjustment in the headlight 10 can be effectively performed.

Further, in FIG. 5 and FIG. 7, in front view of the lamp body 12, the vent hole 12v of the protruded portion 12s is formed to be closer to a circumferential edge portion 34a of the back substrate 34 than the vent hole 12v of the protruded portion 12r. Thereby, the flow rate of the air flow as illustrated by the arrow A that reaches the gap 52 through the gap 51 illustrated in FIG. 10A can be increased. As a result, inflow of the air from the vent hole 12v as illustrated by the arrow B, and outflow of the air from the vent hole 12v as illustrated by the arrow D in FIG. 10B can be prompted.

As illustrated in FIG. 3 to FIG. 5 in the above, the back substrate 34 as a first substrate, the lamp body 12 having the front support columns 12j, 12k and 12m as positioning guide portions that guide and position the back substrate 34 when the back substrate 34 is attached, and the front substrate 26 as a second substrate that is disposed on the lamp body 12 so as to be stacked on the back substrate 34 and is fixed to the tip end portions of the front support columns 12j, 12k and 12m are included.

According to the constitution, the front support columns 12j, 12k and 12m perform guide and positioning of the back substrate 34 and fixing of the front substrate 26, whereby the number of components and cost of the lamp body 12, the headlight 10 as a result can be reduced, as compared with the case where guide portions, positioning portions and fixing portions of the back substrate 34 and the front substrate 26 are individually provided respectively. In addition, weight reduction can also be achieved.

Further, as illustrated in FIG. 4 and FIG. 5, the cutouts 34e, 34f and 34g are formed at the edge portion of the back substrate 34, the cutouts 34e, 34f and 34g and the front support columns 12j, 12k and 12m are engaged, and thereby guide and positioning of the back substrate 34 is performed, so that favorable guide and positioning are enabled by formation of the cutouts 34e, 34f and 34g onto the back substrate 34.

Further, as illustrated in FIG. 3, FIG. 5 and FIG. 7, the front substrate 26 has the LED chips 21H, 21L, 22H and 22L as light sources, the front support columns 12j, 12k and 12m are formed at least on the left, the right, and the upper portion of the lamp body 12, and in the lamp body 12, the back support columns 12p and 12q as the fixing portions that fix the back substrate 34 are disposed at the two spots on the straight line 37 which inclines obliquely with respect to the vertical direction or the horizontal direction, so that the back support columns 12p and 12q that fix the back substrate 34 can be formed at the portions that do not interfere with the front support columns 12j, 12k and 12m. Further, by the front support columns 12j, 12k and 12m, the front substrate 26 having the LED chips 21H, 21L, 22H and 22L is reliably fixed, and favorable guide and positioning of the back substrate 34 can be performed.

Further, as illustrated in FIG. 4, FIG. 5 and FIGS. 10A and 10B, the vent holes 12v that provide communication between the inside and the outside of the lamp body 12 are provided in the lamp body 12, on an inner surface of the lamp body 12 outward in a radial direction from the vent holes 12v, the raised surfaces 14a and 14b as the recesses which form the gaps 51 and 53 between the raised surfaces 14a and 14b and the back substrate 34 (in detail, the lower edge portion 34k and the upper edge portion 34b of the back substrate 34) are provided, so that convection of heat can be smoothly performed on the front and back surfaces of the back substrate 34 by the raised surfaces 14a and 14b which are the recesses. Thereby, ventilation flowing between the inside and the outside of the headlight 10 is prompted through the vent holes 12v, and temperature adjustment in the headlight 10 can be effectively performed.

Further, as illustrated in FIG. 7, the vent bore 12v is provided at one spot in each of an upper half portion and a lower half portion of the lamp body 12, and when the vertical line 27 passing through the center 10A of the lamp body 12 in front view of the lamp body 12 is drawn, the vent holes 12v are positioned respectively at opposite sides from the back support columns 12p and 12q with respect to the vertical line 27, so that the vent holes 12v can be disposed in the lower half portion and the upper half portion of the lamp body 12 to avoid overlapping of the protruded portions 12r and 12s including the vent holes 12v and the back support columns 12p and 12q, and ventilation in the inside and the outside of the lamp body 12 can be prompted by using convection in the lamp body 12.

Further, as illustrated in FIG. 3 and FIG. 5, at least one of the front substrate 26 and the back substrate 34 has the electronic component 35 including the wire harness 35a, and the cutout 26k for routing the wire harness 35a in the front-back direction of at least one of the front substrate 26 and the back substrate 34 is formed at the edge portion, so that routing of the wire harness 35a in the front-back direction of at least one of the front substrate 26 and the back substrate 34 is facilitated, workability can be enhanced, assemblability of at least one of the front substrate 26 and the back substrate 34 can be enhanced, and a degree of freedom of layout can be enhanced.

Further, as illustrated in FIG. 5 and FIGS. 10A and 10B, in front view, the vent hole 12v which is provided in the lower half portion of the lamp body 12 is provided at a position closer to the circumferential edge portion 34a (that is, the lower edge portion 34k) of the back substrate 34 than the vent hole 12v which is provided in the upper half portion of the lamp body 12, so that the flow rates of the air flows passing through the gaps 52 and 54 between the lamp body 12 side (in detail, the protruded portions 12r and 12s) and the back substrate 34 can be increased by convection of heat in the lamp body 12. As a result, inflow of the air from the vent hole 12v provided in the lower half portion of the lamp body 12 (that is, the flow of the air as illustrated by the arrow B) and outflow of the air from the vent hole 12v provided in the upper half portion of the lamp body 12 (the flow of the air as illustrated by the arrow D) can be prompted.

The aforementioned embodiment only illustrates one aspect of the present invention, and modifications and applications can be arbitrarily made within the range without departing from the gist of the present invention.

For example, in the above described embodiment, dispositions of the front support columns 12j, 12k and 12m, the back support columns 12p and 12q, the protruded portions 12r and 12s, the vertical walls 12e and 12f and the inclined wall 12g illustrated in FIG. 7 are not limited to the positions illustrated in FIG. 7, but the front support columns 12j, 12k and 12m, the back support columns 12p and 12q, the protruded portions 12r and 12s, the vertical walls 12e and 12f and the inclined wall 12g may be disposed in positions rotated in a circumferential direction in a state where a positional relationship illustrated in FIG. 7 is kept. In short, at least the front support columns 12j, 12k and 12m, the back support columns 12p and 12q and the protruded portions 12r and 12s can be disposed not to overlap one another.

Further, as illustrated in FIG. 7, the electronic component 35 is attached to the back substrate 34, and the cutout 26k is formed at the edge portion of the front substrate 26, but the electronic component 35 may be attached to the front substrate 26 while the cutout may be formed at an edge portion of the back substrate 34, without being limited to this.

REFERENCE SIGNS LIST

10 Headlight (Lighting system)
10A Center
12 Lamp body
12j, 12k, 12m Front support column (positioning guide portion)
12p, 12q Back support column (fixing portion)
12v Vent hole
14a, 14b Raised surface (recess)
21H, 21L, 22H, 22L LED chip (light source)
26 Front substrate (second substrate)
27 Vertical Line
26k Cutout
34 Back substrate (first substrate)
34e, 34f, 34g Cutout
35 Electronic component
35a Wire harness

The invention claimed is:

1. A lighting system comprising:
a first substrate;
a lamp body including a positioning guide portion that guides and positions the first substrate when the first substrate is attached; and
a second substrate that is disposed in the lamp body to be stacked on the first substrate and is fixed to a tip end portion of the positioning guide portion,
wherein a vent hole that provides communication between an inside and an outside of the lamp body is provided in the lamp body,
on an inner surface of the lamp body outside in a radial direction from the vent hole, a recess that forms a gap between the recess and the first substrate is provided, and
a cutout is formed at an edge portion of the first substrate, and the cutout and the positioning guide portion are engaged with each other, whereby guide and positioning of the first substrate are performed.

2. The lighting system according to claim 1,
wherein the second substrate includes a light source,
the positioning guide portion is formed at least on each of a left, a right, and an upper portion of the lamp body, and
in the lamp body, fixing portions that fix the first substrate are respectively disposed at two spots on a straight line that is inclined obliquely with respect to a vertical direction or a horizontal direction.

3. The lighting system according to claim 2,
wherein the vent hole is provided at one spot in each of an upper half portion and a lower half portion of the lamp body, and
the vent hole is positioned at each of opposite sides from the fixing portions with respect to a vertical line passing through a center of the lamp body in front view of the lamp body.

4. The lighting system according to claim 1,
wherein at least one of the first substrate and the second substrate includes an electronic component including a wire harness, and a second cutout for routing the wire harness in a front-back direction of the at least one of the first substrate and the second substrate is formed at an edge portion.

5. The lighting system according to claim 3,
wherein in front view, the vent hole provided in a lower half portion of the lamp body is provided at a position closer to a circumferential edge portion of the first substrate than the vent hole provided in an upper half portion of the lamp body.

* * * * *